Nov. 9, 1965            J. W. THOMAS            3,216,736
ATTACHMENT FOR A HILLSIDE HARVESTER
Filed April 3, 1964            5 Sheets-Sheet 2

INVENTOR.
JUNIOR W. THOMAS,
BY
McMorrow, Berman + Davidson
ATTORNEYS.

Nov. 9, 1965  J. W. THOMAS  3,216,736
ATTACHMENT FOR A HILLSIDE HARVESTER
Filed April 3, 1964  5 Sheets-Sheet 3

INVENTOR.
JUNIOR W. THOMAS,
BY
McMorrow, Berman & Davidson
ATTORNEYS.

Nov. 9, 1965   J. W. THOMAS   3,216,736
ATTACHMENT FOR A HILLSIDE HARVESTER
Filed April 3, 1964   5 Sheets-Sheet 4
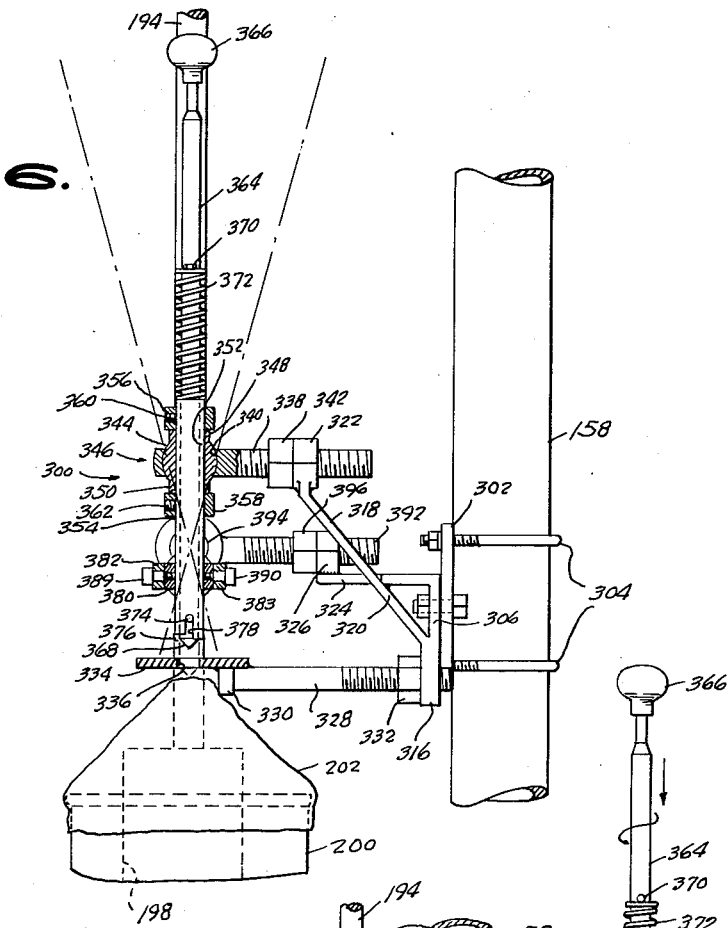
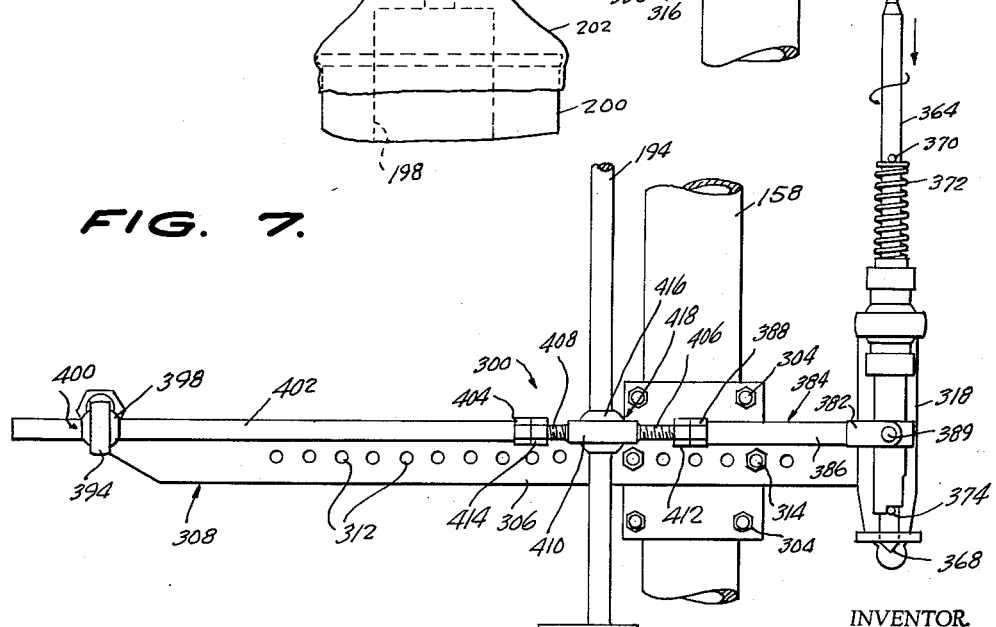
INVENTOR.
JUNIOR W. THOMAS,
BY
McMorrow, Berman & Davidson
ATTORNEYS.

Nov. 9, 1965   J. W. THOMAS   3,216,736
ATTACHMENT FOR A HILLSIDE HARVESTER
Filed April 3, 1964   5 Sheets-Sheet 5

INVENTOR.
JUNIOR W. THOMAS,
BY
McMorrow, Berman + Davidson
ATTORNEYS.

United States Patent Office 3,216,736
Patented Nov. 9, 1965

3,216,736
ATTACHMENT FOR A HILLSIDE HARVESTER
Junior W. Thomas, R.F.D., Prescott, Wash.
Filed Apr. 3, 1964, Ser. No. 357,249
11 Claims. (Cl. 280—6.1)

This invention relates to an attachment for a hillside harvester-thresher and, more specifically, the instant invention pertains to an attachment for a pendulum-controlled hillside harvester-thresher.

One of the primary objects of this invention is to provide an attachment for a pendulum-controlled hillside harvester-thresher for lowering the combine unloading grain auger and housing to a grain truck and conversely, to effect the raising of the combine unloading grain auger and housing to permit the grain truck to be driven under the housing.

Another object of this invention is to provide an attachment for a pendulum-controlled hillside harvester-thresher machine to level the combine when going forward on steep downhill corners.

A further object of this invention is to provide an attachment for a pendulum-controlled hillside harvester-thresher to actuate the pendulum to raise the rear end of the combine for servicing.

Still another object of this invention is to provide an attachment for a pendulum-controlled hillside harvester-thresher which coacts with the pendulum in such a manner as to provide a better performance of the combine in mounting a steep hill and to prevent the combine from surging when one of the traction wheels slips.

Still another object of this invention is to provide an attachment for a pendulum-controlled hillside harvester-thresher wherein the attachment cooperates with the pendulum to indicate the combine level relative to a horizontal plane.

This invention has, as a still further object thereof, the provision of an attachment for a pendulum-controlled hillside harvester-thresher wherein the attachment cooperates with the pendulum to lock the same against movement when the combine is leveled to its capacity in order to prevent hydraulic pump by-pass and undue pressure build-up.

A still further object of this invention is to provide an attachment of the type generally referred to supra, the attachment being non-complex in construction and assembly, inexpensive to manufacture and maintain, and which is durable in use.

Other and further objects and advantages of the instant invention will become more manifest from a consideration of the following specification when read in conjunction with the annexed drawings, in which:

FIGURE 6 is a detail cross-sectional view, FIGURE 6 being taken substantially on the vertical plane of line 6—6 of FIGURE 5, looking in the direction of the arrows;

FIGURE 7 is a side elevational view of the pendulum-control attachment;

Figure 1:
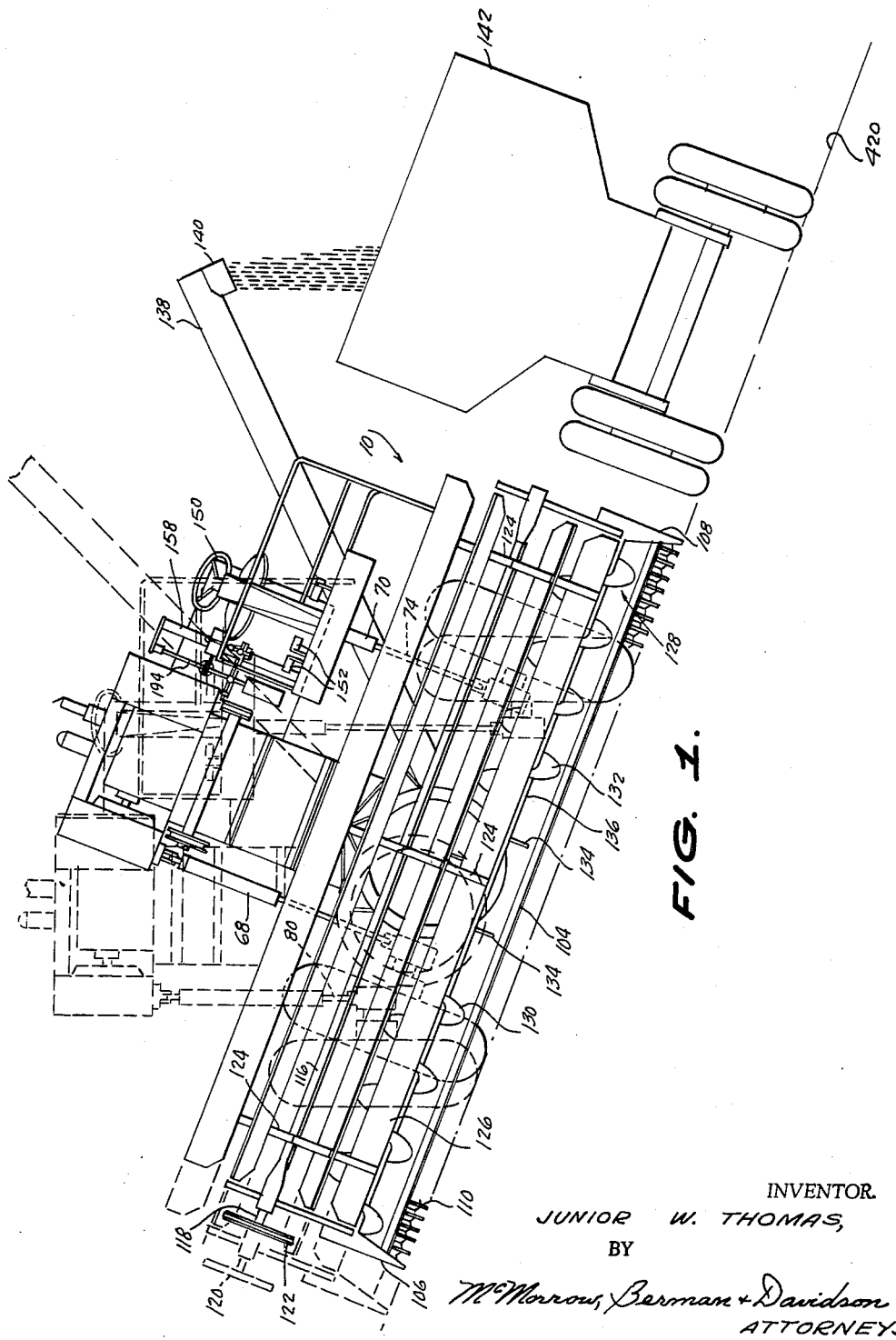
FIGURE 1 is a front elevational view of a pendulum-controlled hillside harvester-thresher as positioned on a hillside wherein the harvesting portion and thresher or separator mechanisms together with the traction wheels are shown in full lines in their normal operating positions and in dotted lines to illustrate the movement thereof to accommodate the harvester-thresher on the hillside.

Before engaging in the specific detailing of the apparatus involved in the instant application, it will be understood that the apparatus or mechanism herein involved is not limited in the described application to the details of construction and arrangement of the parts illustrated in the accompanying drawings, inasmuch as the invention is capable of taking the form of other embodiments and being practiced or carried out in various ways. Furthermore, it will also be understood that the phraseology or terminology as employed herein is for the purpose of description and is not to be construed as being one of limitation.

Reference numeral 10 designates, in general, a harvester-thresher or combine machine of the pendulum-control type in which the attachment according to the teachings of this invention is incorporated. It will be understood that the term "combine" or "harvester-thresher" as used throughout this specification and the claims appended thereto are synonymous and are herein used interchangeably.

The combine or harvester-thresher 10 is here only briefly described, since the same, per se, comprises no part of the instant invention. Therefore, the description of the harvester-thresher has been minimized and is included herein only to serve as a background or environment for the attachment therefor constructed in accordance with this invention. Illustrative of the type of combine or harvester-thresher 10 with which the attachment of this invention may be suitably used is the pendulum-controlled combine shown in Uinted States Letters Patent issued to J. R. Orelind et al., No. 2,796,717, which issued on June 25, 1957.

Figure 9:
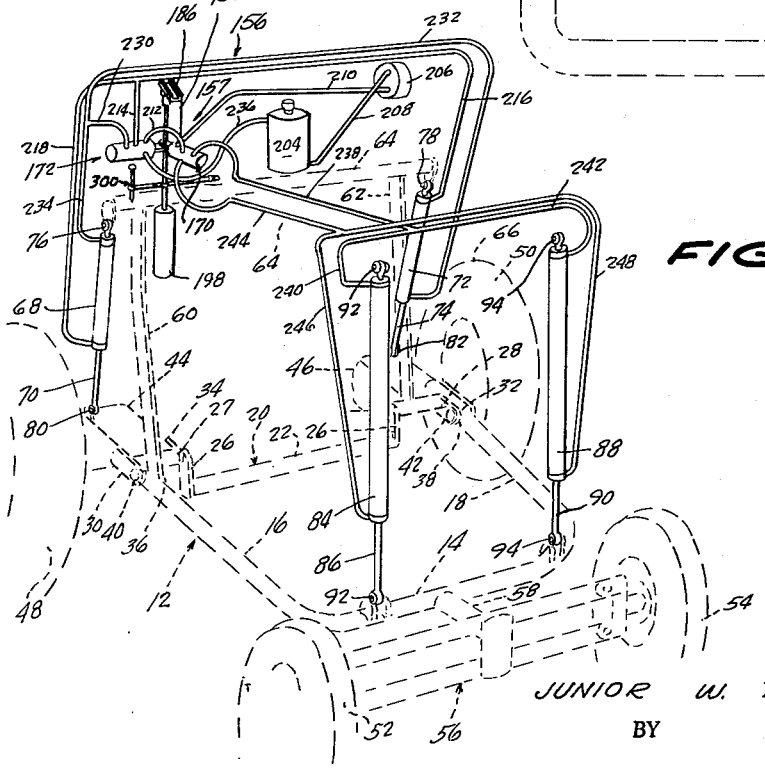
FIGURE 9 is a schematic diagram of the hydraulic-control system.

Again referring to the drawings, and with specific reference to FIGURE 9 thereof, reference numeral 12 denotes a chassis for the combine 10 which comprises a substantially horizontal open U-shaped frame having a bight portion 14 from the opposed ends of which laterally project a pair of laterally spaced and substantially parallel side frame members 16, 18. Reference numeral 20 designates a substantially U-shaped cross-member including a bight section 22 having one of the ends of a pair of upstanding, substantially parallel arms 26, 26, respectively, fixedly secured to the opposed ends of the bight section 22. The upper ends of the arms 26, 26 terminate in laterally diverging shafts 27, 28 whose outer ends are rigidly connected to a pair of horizontally elongated links 30, 32 intermediate the ends of the latter. Reference numeral 34 designates one of a second pair of links, each of which has an end thereof rigidly connected to the shafts 27, 28, respectively, adjacent their inner ends. The links 34 (only one being shown) project forwardly of the shafts 27, 28 and have their respective other ends extending parallel to the forward ends of the links 30, 32. Reference numerals 36, 38 denote a third pair of links, the link 36 having one of its ends extending rearwardly and parallel to the rear end of the link 30, and the link 38 extends rearwardly and parallel to the rear end of the link 32.

The forward or free ends of the side frame members 16, 18 are pivotally connected on pins 40, 42 between the adjacent pairs of links 30, 36 and 32, 38, respectively, and a pair of arms 44, 46 have one of their respective ends pivotally connected between the forward ends of the adjacent pair of links 30, 34 and 32 and the other of the links 34 (not shown).

Traction wheels 48, 50 are connected by conventional means (not shown) to each of the arms 44, 46 to permit the swinging thereof from their normally perpendicular position shown in full lines in FIGURE 1, to an angle on either side thereof, one such adjusted position being shown in dotted lines in this figure.

The rear steering wheels 52, 54 are supported for similar movement on an articulated parallel bar frame 56 which is rotatably supported on the rear end of an axle 58 having its inner or forward end fixedly connected to the bight portion 14 intermediate its ends.

Fixedly connected on the shafts 27, 28 are the lower ends, respectively, of a pair of upright front frame members 60, 62 connected at their respective upper ends to a cross torque tube 64 adjacent the opposed ends thereof. One end of a longitudinally disposed torque tube has one of its ends rigidly connected with the cross torque tube 64 and its other end extends rearwardly toward connection with a second cross torque tube.

Reference numeral 68 designates a first hydraulic cylinder having an extensible and retractable piston rod mounted for reciprocation therein. Reference numerals 72, 74 designate a second hydraulic cylinder and piston rod, respectively. The cylinders and piston rods 68, 72 and 70, 74 are disposed adjacent the forward end of the chassis 12, the hydraulic cylinders 68, 70 at their upper ends being pivotally connected at 76, 78 to the remotely disposed ends of the torque tube 64 and the lower ends of the piston rods 70 are pivotally connected at 80, 82 to the forward ends of the arms 44, 46.

Reference numeral 84 denotes a third hydraulic cylinder having a piston rod 86 and numerals 88, 90 designate a fourth hydraulic cylinder and piston rod, respectively. The hydraulic cylinders and piston rods 84, 86 and 88, 90, respectively, are disposed adjacent the rear of the chassis 12, and the upper ends of the hydraulic cylinders 84, 88 are pivotally connected at 92, 94 to the remotely disposed ends of the second torque tube 66 adjacent the remotely disposed ends of the latter. The lower ends of the piston rods 86, 90 are pivotally connected at 92, 94 to the bight portion 14 adjacent the remote ends thereof.

Figure 3:
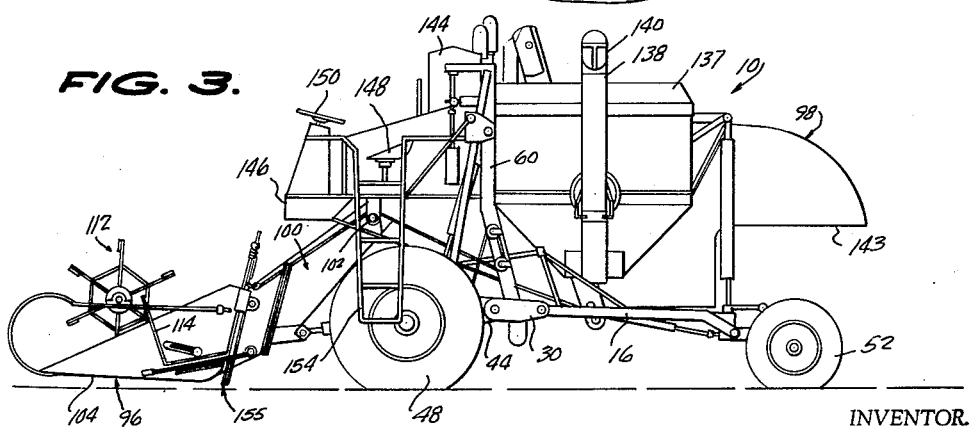
FIGURE 3 is a side elevational view on a reduced scale of a pendulum-controlled harvester-thresher.
Figure 4:
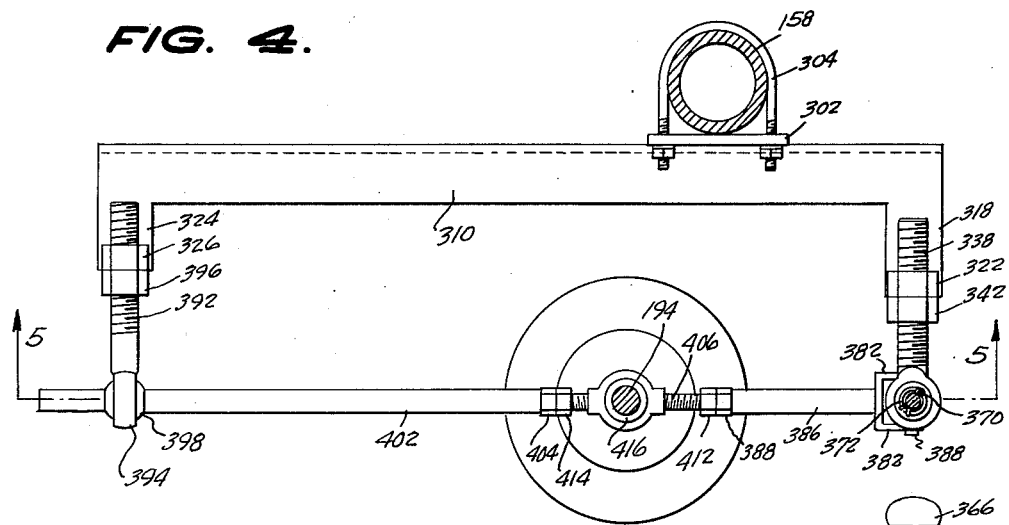
FIGURE 4 is an enlarged top plan view of the pendulum-control attachment constructed according to this invention, FIGURE 4 being taken substantially on the horizontal plane of the line 4—4 of FIGURE 2, looking in the direction of the arrows.
Figure 5:
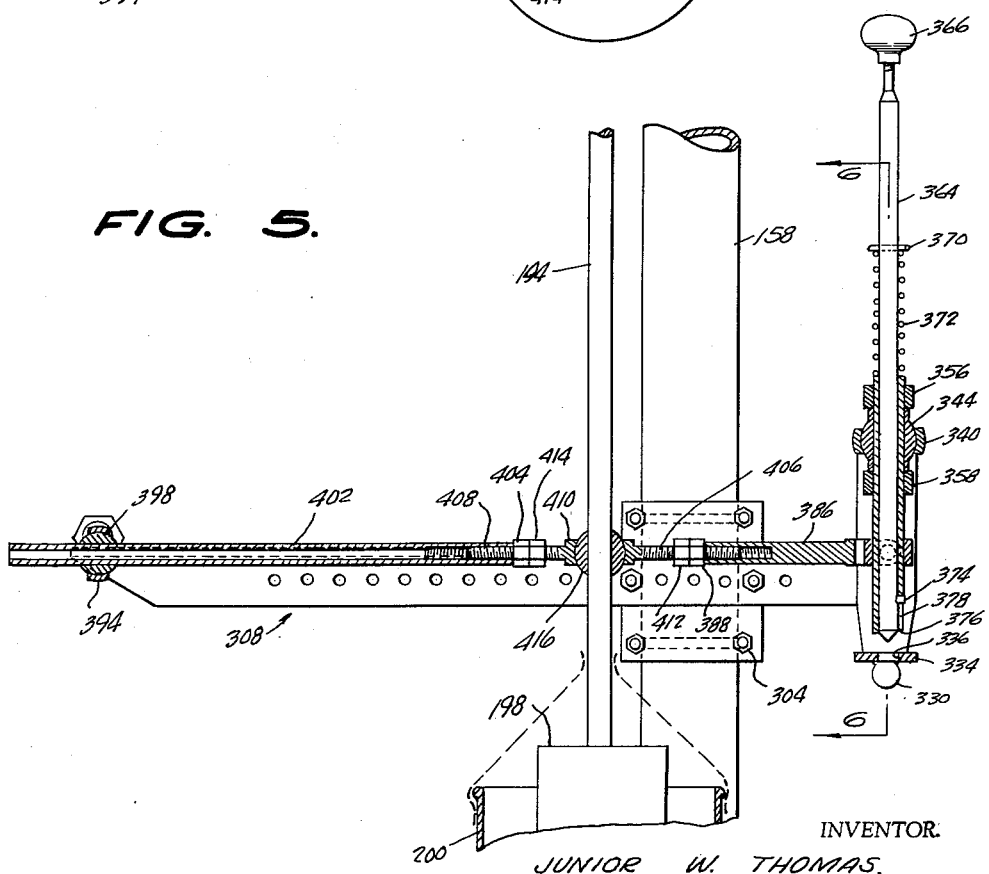
FIGURE 5 is a detail cross-sectional view of the pendulum-control attachment, FIGURE 5 being taken substantially on the horizontal plane of line 5—5 of FIGURE 4, looking in the direction of the arrows.

The above-described chassis 12 supports (see FIGURE 3) the conventional harvesting portion 96, a separator mechanism 98, and feeder housing 100 pivotally connected at 102 to the separator housing 98. The combine structure 10 also includes a relatively wide platform 104 (see FIGURES 1 and 3) having spaced end dividers 106, 108 and a sickle bar 110. The sickle bar 110 extends across the full forward edge of the platform 104 and the platform 104 is also provided with a grain reel 112 journally mounted on standards 114 disposed at the opposite ends of the platform 104 and closely associated with the end dividers 106, 108. The reel 112 is provided with a longitudinally extending central shaft 116 having an extension 118 on which is mounted a sprocket 120 to receive a driving chain 122 to effect rotation of the reel 112. The reel 112 is provided with a plurality of spider members 124 which carry reel bats 126 at their lower ends. The bats 126 are so arranged and constructed as to sweep downwardly on the standing grain to cause the grain to be delivered rearwardly into the forwardly extending sickle bar 110 whereupon the grain is severed at its lower end and is deposited rearwardly onto the platform 104. It will be understood, of course, that the platform 104 is adapted to pass closely over the ground to receive the grain thereon. The platform 104 has a transversely disposed auger conveyor 128 extending across the substantially flat surface thereof, the auger conveyor 128 being provided with oppositely pitched spiral flights 130, 132. The flights 130, 132 are adapted to deliver material centrally of the platform adjacent the rearwardly and upwardly inclined feeder housing 100. This central portion of the platform is designated by reference numeral 130 and is swept clean of grain received from the moving flights 130, 132 and also grain which falls directly thereon by means of retractable fingers 134. The fingers 134 extend outwardly from the core 136 of the transverse auger 128. All of this is conventional construction and forms no part of the instant invention.

In the usual manner, and following the harvesting and gathering of grain by the harvesting portion 96, the cut grain is moved centrally of the wide platform 104 and is moved upwardly and rearwardly by conveyor means (not shown) located in the centrally disposed feeder housing 100. At the upper end of the feeder housing 100 the grain is delivered to a threshing mechanism (not shown) and thereupon the grain is threshed and subsequently separated in the housing 98. Thereafter, the clean grain is deposited in a grain-receiving tank 137 which is subsequently discharged through an auger or elevator-type of conveyor means 138 and spout 140 to a truck or wagon 142. The threshed material is discharged outwardly and rearwardly through the back end 143 of the separator housing 98. The various mechanisms of this harvester-thresher, as well as the propulsion thereof, are accomplished by means of engine 144 disposed across the top of the forward end of the separator housing 98. An operator's platform 146 is mounted at a position adjacent the forward end of the separator housing 98 and rearwardly of the harvesting portion 96. In the usual manner, the operator's platform 146 includes an operator's seat 148 disposed proximate a steering wheel 150 and operating foot pedals 152 which control the operation and movement of the combine. Mounting stairs 154 are suspended from the operator's platform 146 and enables the operator to mount the combine.

The harvester platform 104 is mounted on a pivot or turntable 155 which is positioned between the lower forward end of the feeder housing 100 and the back central portion of the platform 104. Thus, means are provided to permit the platform to rotate about the turntable 155 to assume any inclination whereby a field of standing grain on a hillside may be traversed and evenly cut since the platform 104 may be positioned parallel to an inclined slope over which the combine operates.

In carrying out the usual operations of a combine, it is necessary that the thresher and separator housing 98 be maintained horizontally level despite any slope on which the combine 10 may operate. In order that this position be maintained, it is necessary that means be provided so that the rise of one of the traction wheels 48 or 50 will be compensated in an equal and opposite amount of fall of the other of the traction wheels. This equalizing structure is fully set forth in the aforementioned patent to Orelind et al., and involves the stabilizing hydraulic cylinders 68, 70 and their respective piston rods 72, 74 at the forward end of the combine, and the hydraulic cylinders 84, 88 and their associated piston rods 86, 90 at the rear end of the combine 10. These means are controlled by a hydraulic system designated, in general, by the reference numeral 156 (see FIGURE 9) under the control of pendulum-controlled valve means indicated, in general, by reference numeral 157. The pendulum-controlled valve means comprises a vertically elongated, substantially hollow cylindrical standard 158 having one of its ends fixedly secured to the chassis 12 at any desirable location, and in this instance, the lower end of the standard 158 is connected with the cross torque tube 64 intermediate the ends thereof.

Figure 2:
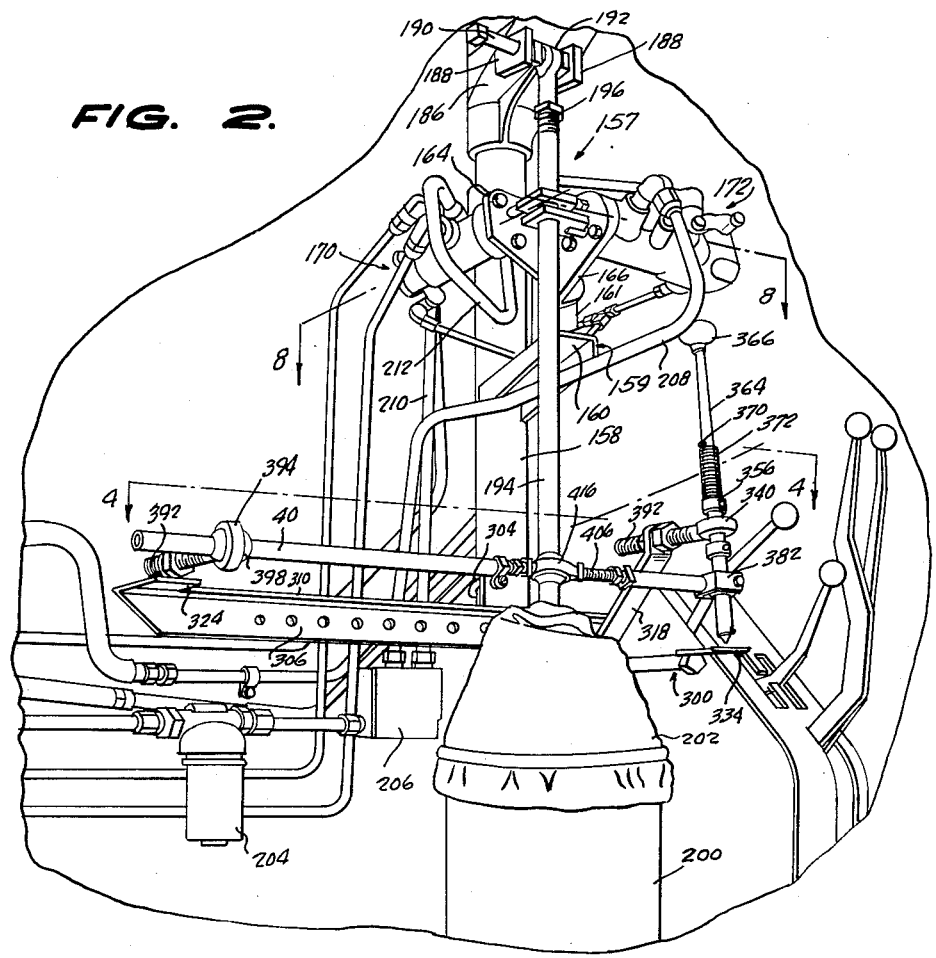
FIGURE 2 is an enlarged fragmentary perspective view of the pendulum-controlled hydraulic valve system and illustrating a pendulum-control attachment according to this invention.
Figure 8:
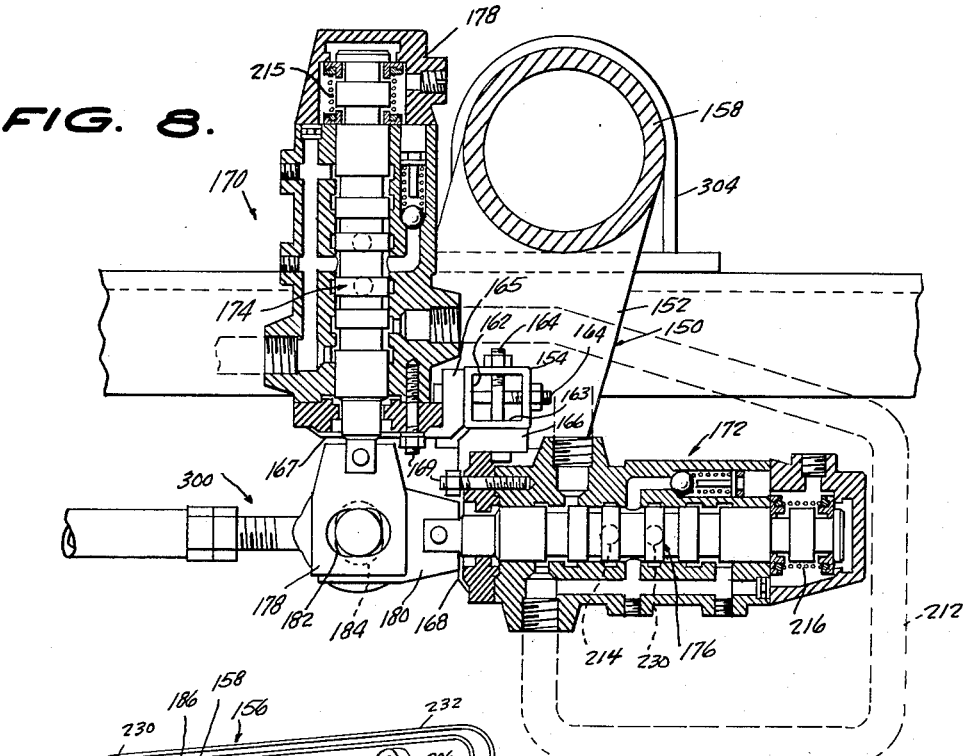
FIGURE 8 is an enlarged detail, cross-sectional view of the valve-control means of the hydraulic control system.

Fixedly secured to the standard 158 intermediate its ends is a laterally projecting inverted, substantially U-shaped channel member 159 having a central bight section 160 (see FIGURE 2). One end of an upright substantially hollow rectangular support member 161 is fixedly secured to the bight section 160. The rectangular support member 161 includes a pair of vertically elongated, substantially rectangular sides 162, 163 (see FIGURE 8) disposed at right angles with respect to one another to which are secured, as by bolts 164, the feet 165, 166 of a pair of right-angled brackets. Reference numerals 167, 168 denote the leg portions of the right-angled brackets, the leg portions being, as shown in FIGURE 8, disposed substantially perpendicular, one with respect to the other. To the leg portions 167, 168 are fixedly connected, as by bolts 169, a pair of identically constructed valves 170, 172. The valves 170, 172 are of the spool-type, and of these valves, the valve 170 controls the fore-and-aft leveling of the combine, and the valve 172 controls the cross or transverse leveling. The valve 170 is positioned substantially parallel to the length of the separator housing 98 and the valve 172 is positioned substantially crosswise with respect thereto. The spool valves 170, 172 are each provided with a valve spool 174, 176, respectively, and each valve spool has an extension 178, 180. The extension 178 is vertically spaced above the extension 180, and the extensions 178, 180 are formed with elongated apertures 182, 184 having their respective major axes disposed, respectively, at right angles with respect to each other.

A flange 186 has one of its ends fixedly connected to the upper end of the cylindrical standard 168 and projects laterally therefrom. Depending from the flange 186 are a pair of laterally-spaced lugs 188 which support a pivot pin 190 therebetween. Swingably mounted on the pivot pin 190 between the lugs 188 is the eye 192 of an elongated pendulum rod 194 whose effective length may be adjusted through conventional adjustment means 196. The connection of the pendulum rod eye 192 with the pivot pin 190 is sufficiently loose so as to constitute, in effect, a universal connection therebetween. As is seen in FIGURES 2 and 8, the lower end of the pendulum rod 194 passes through the crossed apretures 182, 184 and terminates at its lower end in an elongated substantially cylindrical weight 198. The weight 198 is normally disposed within a housing 200 in which it is free to swing, and the housing 200 may, if desired, contain dampening liquid (not shown). The upper end of the housing is normally open and is closed by a substantially flexible cover cap 202 through which the lower end of the pendulum rod 194 also extends.

A fluid reservoir 204 may be fixedly connected on the separator housing 98, and a pump 206 is connected with the reservoir 204 through a conduit 208. The pump 206 is adapted to deliver fluid under pressure from the reservoir 204 through the conduit 210 to the valves 170, 172. While the conduit 210 is shown as being directly connected with the spool valve 170, with the valve spools 174, 176 in their respective neutral positions, fluid passes from the valve 170 to the valve 172 through the conduit 212. The valve spools 174, 176 are constantly biased for movement toward their respective neutral positions under the influence of the helicoidal springs 215, 216, respectively. Thus, fluid under pressure passes from the pump 206 to both of the control valves 170, 172. A conduit 214 has one of its ends fastened to the valve 172 and its branches 216 and 218, respectively, extend to the top of the cylinder 70 and to the bottom of the cylinder 68. This insures that as one traction wheel is raised, the other is lowered. In a like manner, a conduit 230, leading from the control valve 172 has a branch 232 which passes to the bottom of the cylinder 70 and a branch 234 which passes to the top of the cylinder 68, thereby enabling the cylinders 68, 70 to either act to extend or retract their respective piston rods 72, 74 to either raise or lower the wheel-carrying arms 44, 46. Either of the conduits 214 and/or 230 acts at one time to deliver a fluid under pressure to the cylinders 68, 70 and/or to exhaust fluid under pressure from these same cylinders, and thereupon deliver the fluid under pressure back to the reservoir tank 204 through the conduit 236.

In considering the control valve 170, fluid under pressure is delivered from and through the conduit 238 to branches 240 and 242 to the tops of the cylinders 84, 88, respectively; and similarly, the conduit 244 through branches 246 and 248 delivers or exhausts fluid under pressure from the bottoms of the cylinders 84, 88. The conduit 236 joins the control valve 172 and the reservoir 204, thereby permitting exhaust of the fluid back to the reservoir 204. This single conduit 236 in association with the conduit 212 joining the valves 170, 172, permits the exhaust from both of the control valves back to the reservoir 204. Thus, leveling of the machine is controlled by the hydraulic action of the fore-and-aft leveling cylinders 84, 88 and the side leveling cylinders 68, 70.

Each of the slots or apertures 182, 184 is long enough so that the pendulum rod 194 may swing one way without operating one of the valves; but if it swings to or from the length of either of the slots, that valve associated therewith will be operated. It is, of course, quite obvious that in many instances both valves are operated simultaneously. These spool valves 170, 172 are very short stroke valves, and but very little movement of the pendulum weight 198 is required to operate the valves. The pump 206 operates the valves 170, 172 in series, and the valves are of the tandem type and either or both may be operated, depending upon the swing of the pendulum weight 198.

Fluid by-pass means (not shown) are employed to by-pass the fluid under pressure when the combine has reached the limit of its compensatory leveling. Since these means are of no import to the instant invention, no further reference thereto will be made.

The attachment to which the instant invention is specifically directed is clearly seen in FIGURES 2 and 6 to 9, inclusive. In these figures the attachment is generally indicated by reference numeral 300. As is illustrated in these figures, the attachment 300 is seen to comprise a substantially rectangular support plate 302 which is fixedly clamped to the upright standard 158 by means of a plurality of U-bolts 304. To the support plate 302 is connected the leg portion 306 of an angle member 308 having a normally horizontal foot portion 310. As is clearly seen in FIGURE 7, the leg portion 306 is provided with a plurality of longitudinally spaced, transverse extending apertures 312 through which extend bolts 314 whereby the angle member 308 may be adjustably connected to the support plate 302. The leg portion 306, at one end thereof, is provided with a downwardly depending, internally threaded boss 316 from the upper side of which projects an angularly inclined strut 318. As is clearly seen in FIGURE 6, the strut 318 is welded as at 320 to rigidly connect the strut 318 to the outer edge of the foot portion 310. The upper end of the strut 318 terminates in an integrally-formed internally threaded boss 322. The other end of the foot portion 310 has integrally formed therewith a laterally projecting arm 324 to which is welded or otherwise fixedly secured an internally threaded upright boss 326.

Threaded into the boss 316 and projecting laterally therefrom is an elongated bolt 328 having an enlarged head 330. The bolt 328 has a lock nut 332 threaded thereon to fixedly secure the bolt 328 in any desired axial adjustment relative to the leg portion 306. Projecting longitudinally from the bolt 328 and fixedly secured thereto and to the head 330 is an elongated substantially rectangular palte 334 having a substantially centrally positioned, transversely extending aperture 336 formed therein.

Threaded in the boss 322 is one end of a bolt 338, the other end of the bolt 338 terminating in an enlarged socket 340 to serve a function to be described. As is clearly seen in FIGURE 6, a lock nut 342 is threaded on the bolt 338 to fixedly hold the bolt 338 in axially adjusted relationship relative to the boss 322. The bolts 328 and 338 are preferably vertically aligned and their respective longitudinal extending axes are parallel, one with the other. It should also be noted that the center point of the socket 340 coincides with the center point of the aperture 336.

A ball 344 is mounted within the socket 340, the ball 344 and socket 340 cooperating to form a universal joint 346. The ball 344 is integrally formed with a pair of diametrically opposed bosses 348, 350 and through the ball 344 and the bosses 348, 350 extends a continuous bore 352. Extending through the bore 352 is an elongated substantially hollow cylindrical sleeve 354, the sleeve 354 extending at its respective ends above and below the bosses 348, 350. Collars 356, 358 are mounted on the sleeve 354 and are secured thereto by set screws 360, 362. As is seen in FIGURE 6, the collars 356, 358 abut against the outer ends of the bosses 348, 350, whereby the sleeve 354 is prevented from moving axially in the bore 352. Mounted for reciprocation through the sleeve 354 is an elongated substantially cylindrical lever 364 having a manually operable control knob 366 fixedly secured to the upper end thereof. The lower end of the lever 364 terminates in an inverted conical point 368. The lever 364, adjacent the upper end thereof, is provided with a radially extending pin 370 and surrounding the lever 364 and extending between the upper end of the sleeve 354 and the pin 370 is a helicoidal spring 372 under tension. It is thus seen that the lever 364 is constantly biased for movement in a vertical direction.

The lower end of the lever 364 is provided with a second radially extending pin 374 to which reference will be made below.

Referring specifically to FIGURES 6 and 7 of the drawings, it will be seen that the lower end of the sleeve 354 is cut away to form an arcuate, inwardly extending slot 376 which, at one of its ends, is in open communication with an axially extending slot 378. In FIGURE 6 the pin 374 is shown as engaging the inner end of the slot 378, thereby preventing further upward movement of the lever 364, and in FIGURE 7, the lever 364 is shown as having been depressed and rotated in the direction of the arrows to cause the pin 374 to ride out of the slot 378 and into the slot 376, whereby the lever 364 is locked in a downward position. The arrangement between the lever 364 and the aperture 336 formed in the plate 334 is such that with the longitudinal axis of the lever 364 aligned with the center point of the aperture 336, the pointed end 368 and a portion of the lower end of the lever 364 will enter and pass through the aperture 336, thereby holding the lever 364 against movement.

The sleeve 354 has a collar 380 fitted thereon adjacent the lower end thereof. The collar 380 is embraced at diametrically opposed sides thereof by a pair of arms 382, 383 of a yoke generally indicated at 384. The yoke 384 is provided with a normally horizontal stem 386 having an enlarged, internally threaded boss 388 at the outer end thereof. The arms 382, 383 are pivotally connected to the collar 380 by means of screws 389, 390.

Reference numeral 392 denotes an elongated bolt threaded into the boss 326. As is seen in FIGURES 6 and 7, one end of the bolt terminates in a socket 394, and the socket and bolt are held in longitudinally adjusted relationship by means of a lock nut 396. The socket 394 receives therein a ball 398, the ball and socket 398, 394 cooperating to form a universal joint 400.

Slidably extending through the ball 398 is an elongated substantially cylindrical rod 402, the rod 402 being coaxial with the stem 386. The rod 402 is provided at one of its ends with an enlarged internally threaded boss 404, and the internally threaded bosses 388, 404 are adapted to threadedly receive one of the ends of a pair of right and left-hand threaded bolts 406, 408, the other ends of the bolts 406, 408 being rigidly connected to a socket 410 at diametrically opposed sides thereof. Lock nuts 412, 414 are threaded on the bolts 406, 408 to hold the same in axially adjusted relation relative to the stem 386 and the rod 402. This same means will hold the socket 410 in a fixed adjusted position. A ball 416 is mounted in the socket 410 and the two cooperate to form a ball and socket universal joint 418. The ball 416 slidably receives the pendulum rod 194, and it will be understood, of course, that the rod 402 is slidably mounted within the ball 398.

The attachment 300 finds utility in many phases of the operation of the self-leveling and self-propelled combine 10. For example, in the usual combine operation on a hillside, such as illustrated in FIGURE 1, the platform 104 is shown as being parallel to an inclined ground line 420 and the other components supported on the chassis 12 are shown in their self-leveled positions in dotted lines. The dotted-line position of these component elements is due, of course, to the pivotal action of the pendulum rod 194 and the position of the control valves 170, 172. That is, the valve spool 176 has been actuated to open fluid flow to the conduit 234 to force the piston rod 70 downwardly and at the same time, has opened the conduit 232 to the pressure side of the pump 206. While this operation stabilizes the combine 10, the auger housing 138 becomes elevated, carrying with it the discharge spout 140. This has the effect of causing the harvested grain to be discharged short of the truck 142, thereby wasting a large percentage of the grain. With the attachment according to this invention, the pendulum control valves 170, 172 can be overridden by shifting the lever 364 to reverse the flow of fluid through the valve 172. This would mean, reference being made to FIGURE 9, that the lever 364 would be moved to the left to bring the combine elements as shown in dotted lines in FIGURE 1 to their full-line positions as illustrated therein.

In high winds or on steep inclines, the discharge spout 140 and the housing 138 are generally positioned very close to the truck 142, so close, in fact, that clearance therebetween is negligible. Under such circumstances the features of the self-leveling combine must be overridden through the actuation of the control lever 364 to raise and lower the auger housing 138 to permit a loaded truck to move from under the spout 142 and an empty truck driven thereunder. Again, and assuming that the combine is moving in a straight line over a substantially level road, the component elements of the combine assume their full-line position shown in FIGURE 1, but if a downhill grade on a curve is encountered, the sickle bar 110 and one of the points 106, 108 will engage the ground on the inside of the curve. This is prevented by shifting the control lever in the appropriate direction to raise or lower one side of the platform 104 in accordance with the road grade.

Still further, the chassis 12 and its associated elements may be locked in any given degree of angularity relative to a horizontal plane through the simple expedient of depressing and turning the control lever 364 in the direction of the arrows shown in FIGURE 7 to cause the pointed end 368 thereof to pass through the aperture 336 and to lock the pin 374 in the arcuate slot 376.

The articulation between the control lever 364 and the pendulum rod 194 is universal throughout, whereby the valves 170, 172 may be manually controlled for fore-and-aft leveling as well as transverse leveling, and any combination thereof.

The threaded bolts 406, 408 provide adjustment means to accommodate the pendulum rod 194 in its normal upright position, and, of course, the angle of inclination of the combine 10 may be readily ascertained by reference to the control lever 364 with respect to the aperture 336, it being assumed that the lever 364 is free from its locked position.

The apertures 312 provide gross adjustable means for mounting the attachment 300 on any of the conventional pendulum-controlled, self-propelled combines.

Having described and illustrated one embodiment of this invention in detail, it will be understood that the same is offered merely by way of example, and that the scope of this invention is to be limited only by the appended claims.

What is claimed is:

1. In combination with a pendulum-controlled self-leveling combine including a chassis, a fore-and-aft leveling valve, a transverse leveling valve, said valves being mounted on said chassis, and a pendulum rod mounted for universal movement on said chassis and connected with said valves to effect the operation thereof in response to varying ground grades, a control lever universally mounted on said chassis and connected with said pendulum rod to follow the movement of said pendulum rod, and means releasably securing said lever and said rod against movement.

2. In combination with a pendulum-controlled self-leveling combine having a chassis, a fore-and-aft leveling valve, a transverse leveling valve, and a pendulum rod mounted for universal movement on said chassis and connected with said valves to operate any one thereof or both in response to varying ground levels, an elongated, manually operable control lever, universal means connecting said lever on said chassis, and universal means connecting said pendulum rod with said first universal means whereby said pendulum rod may be moved in response to movement of said control lever and actuate said valves in response thereto.

3. In combination with a pendulum-controlled self-leveling combine having a chassis, a fore-and-aft leveling valve, a transverse leveling valve, and a pendulum rod mounted for universal movement on said chassis and connected with said valves to operate any one or both thereof in response to varying ground levels, a normally upright elongated control lever, a first universal means connecting said control lever intermediate its ends on said chassis, an elongated rod, second universal means connecting one end of said rod with said chassis, said rod being axially shiftable in said second universal means, means pivotally connecting the other end of said rod to said control lever, and universal means interposed in said rod intermediate its ends to slidably and swingably receive said pendulum rod therein.

4. In the combination defined in claim 3, and a plate fixedly secured on said chassis, said plate having an aperture formed therein, and said control lever being axially and rotatably movable in said first universal means to releasably insert the lower end thereof in said aperture to hold said lever and said pendulum rod against movement.

5. In the combination defined in claim 4, and means to releasably lock said control lever in its holding position.

6. In the combination defined in claim 5, and means constantly biasing said control lever for axial movement away from its said holding position.

7. In the combination defined in claim 6, and means adjustable to support said first universal means spaced from said chassis.

8. In the combination defined in claim 7, and means connected in said rod to change the effective length thereof.

9. An article of manufacture comprising an attachment to control the pendulum rod of a pendulum-controlled self-leveling combine including a chassis, said attachment comprising a substantially elongated rigid element for connection with said chassis, said element having a pair of opposed ends, first universal means mounted on said element adjacent an end thereof, an elongated rod having one end thereof mounted in said first universal means for axial shifting and rotatable movement therein, a second universal means connected in said rod intermediate its ends to receive said pendulum rod for axial and rotatable movement therein, a control lever, a third universal means mounted on said element and supporting said control lever intermediate its ends for axial and rotary movement therein, and means pivotally connecting the other end of said rod with one end of said control lever.

10. An article of manufacture as defined in claim 9, and means constantly biasing said control lever for axial movement in one direction.

11. An article of manfuacture as defined in claim 10, and means on said control lever cooperating with said last-named universal means to hold said control lever against axial and rotary movement.

References Cited by the Examiner
UNITED STATES PATENTS

| 1,936,518 | 11/33 | McColm | 280—6 X |
| 2,229,530 | 1/41 | South. | |
| 2,796,717 | 6/57 | Orelind | 280—6.1 X |
| 2,854,138 | 9/58 | Sheard | 280—6.1 X |
| 2,904,911 | 9/59 | Coles | 280—6 X |
| 2,920,636 | 1/60 | Gassner | 280—6 X |
| 2,934,078 | 4/60 | Gurries | 280—6.1 X |

BENJAMIN HERSH, *Primary Examiner.*

LEO FRIAGLIA, *Examiner.*